United States Patent
Farley et al.

(10) Patent No.: US 6,735,430 B1
(45) Date of Patent: May 11, 2004

(54) MUSICAL TELEPHONE WITH NEAR FIELD COMMUNICATION CAPABILITIES

(75) Inventors: Felipe Jose Farley, Smyrna, GA (US); Philip Henry Burrus, IV, Lilburn, GA (US)

(73) Assignee: Motorola, Inc., Schaumburg, IL (US)

( * ) Notice: Subject to any disclaimer, the term of this patent is extended or adjusted under 35 U.S.C. 154(b) by 408 days.

(21) Appl. No.: 09/653,110

(22) Filed: Aug. 31, 2000

Related U.S. Application Data

(60) Provisional application No. 60/195,807, filed on Apr. 10, 2000.

(51) Int. Cl.[7] ................. H04M 3/16; H04M 11/10
(52) U.S. Cl. .............. 455/414.1; 455/418; 455/420; 455/458; 455/567
(58) Field of Search ................. 455/418, 419, 455/420, 412.1, 412.2, 414.1, 567, 458, 416, 456.6, 518

(56) References Cited

U.S. PATENT DOCUMENTS

| | | | |
|---|---|---|---|
| 4,173,016 A | * 10/1979 | Dickson | ............... 342/42 |
| 4,388,524 A | 6/1983 | Walton | |
| 4,672,660 A | 6/1987 | Curtin | |
| 5,086,394 A | * 2/1992 | Shapira | ............... 705/1 |
| 5,475,377 A | 12/1995 | Lee | |
| 5,587,823 A | * 12/1996 | Yoshino et al. | ............ 398/107 |
| 5,731,575 A | 3/1998 | Zingher et al. | |
| 5,761,618 A | 6/1998 | Lynch et al. | |
| 5,809,412 A | 9/1998 | Daurio et al. | |
| 5,920,821 A | 7/1999 | Seazholtz et al. | |
| 6,047,178 A | * 4/2000 | Frlan | ............... 455/423 |
| 6,088,435 A | * 7/2000 | Barber et al. | .......... 379/205.01 |
| 6,094,587 A | * 7/2000 | Armanto et al. | ............ 455/567 |
| 6,331,972 B1 | * 12/2001 | Harris et al. | ............ 370/313 |
| 6,487,180 B1 | * 11/2002 | Borgstahl et al. | ........... 370/310 |
| 6,549,768 B1 | * 4/2003 | Fraccaroli | ............... 455/445 |

* cited by examiner

Primary Examiner—William Trost
Assistant Examiner—Stephen D'Agosta
(74) Attorney, Agent, or Firm—Philip H. Burrus, IV

(57) ABSTRACT

A group of electronic communications devices like cellular phones, for example, can be programmed with similar identification data and audible announcements. When the phones come into close proximity with each other, they verify that they have common identification data, and then emit audible messages. For example, when two Georgia Tech fans can program their cellular phones with the "Tech identifying code". The first may program "Go Jackets!", while the other may program "Sting 'em!". When the fans' phones come into close proximity in a crowd, their phones acknowledge each other by recognizing the identification code. Once verified, the first phone would emit "Go Jackets!" while the second emits "Sting 'em!" Alternatively, the phones could play parts of the Georgia Tech fight song, with one phone starting the chorus with "I'm a Ramblin' Reck from Georgia Tech . . ." and the other following with ". . . and a helluva engineer!"

2 Claims, 3 Drawing Sheets

MUSICAL TELEPHONE WITH NEAR FIELD COMMUNICATION CAPABILITIES

CROSS-REFERENCE TO RELATED APPLICATIONS

This application claims priority from U.S. Provisional Application Ser. No. 60/195,807, filed Apr. 10, 2000, entitled "Musical Cellular Telephone", the disclosures of which, including all attached documents and appendices, are incorporated by reference in their entirety for all purposes.

TECHNICAL FIELD

This invention is related generally to telephone handsets and, more specifically, to identification systems integrated into cellular telephones.

BACKGROUND

There are numerous social events where people want to identify people of like circumstances. For example, at a political convention, delegates may want to be able to identify others from their home state to discuss important political issues. While some may be boisterous and stand up and yell, "Who the heck here is from Texas?", others may not be so brazen. If one is particularly shy or reserved in public, this is not an appropriate means to employ.

An alternative method is to wear loud, obnoxious clothing to identify your group. Referring to the previous example, delegates may wear shirts that say, in large, neon, psychedelic letters, "You're darned tootin' I'm from Texas." This method of identifying people also has limitations. For example, if one is interviewed on television, they may not want friends and family to see them in loud garments. Second, the price conscious delegate may not want to pay for a garment that can only be worn at one event. Consequently, he may not buy the shirt. Thus, valuable political discussions may be compromised by his absence, which was in turn caused by his inability to be identified in a crowd.

There is thus a need for an improved method of identifying people of similar circumstances.

DETAILED DESCRIPTION OF THE INVENTION

Figure 1:
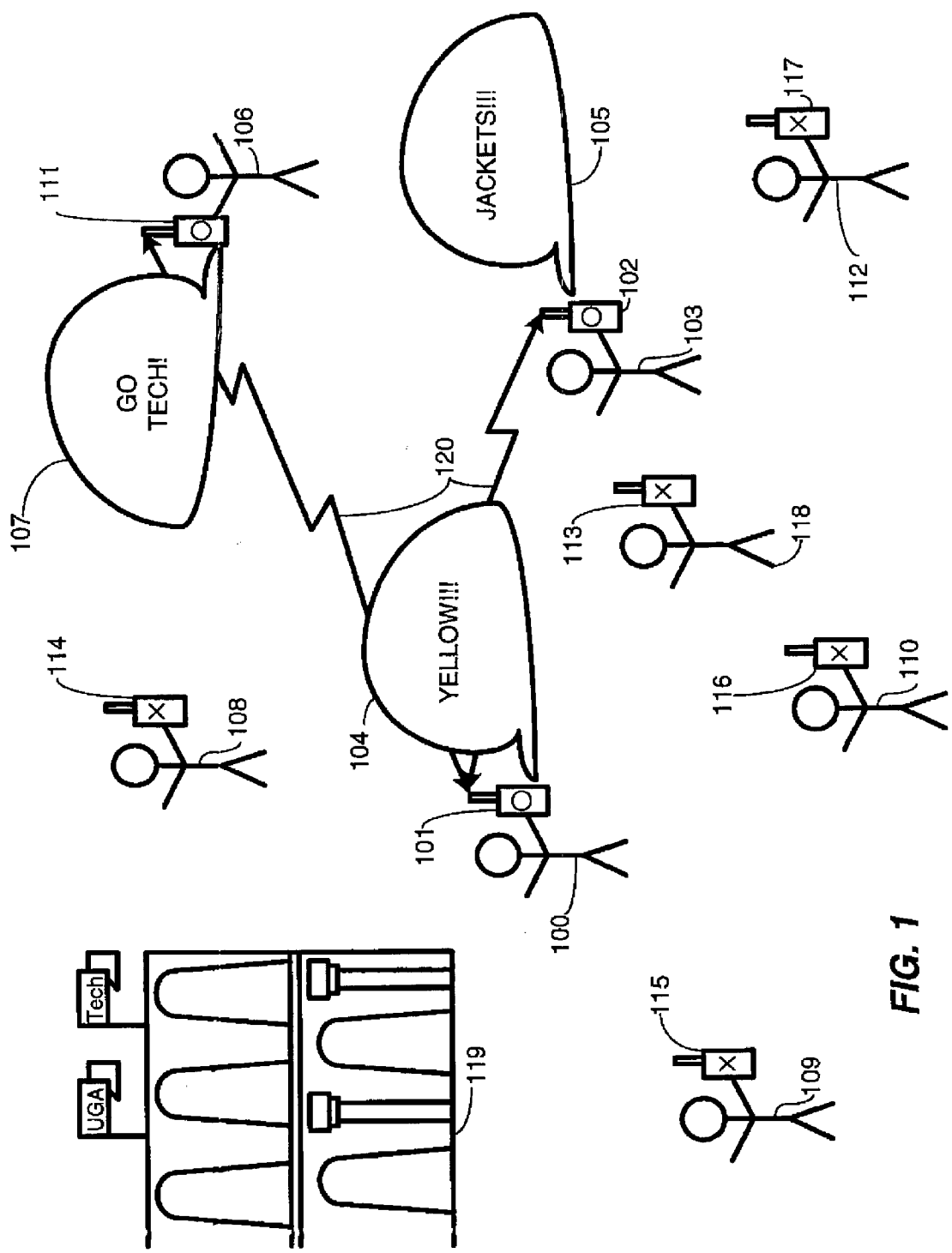
FIG. 1 is an application of one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

One embodiment of the present invention is a musical cellular telephone, or more broadly, a musical two-way communication device capable of recognizing and reacting to other communications devices similarly programmed. More specifically, a preferred embodiment is a system for making these devices interact in a musical or audible way. While the invention is generally directed towards cellular telephones, it is not so limited. The invention may equally be applied to two-way radios, two-way pagers, personal digital assistants with two-way communication capabilities, and portable computers with two-way communication capabilities.

In one embodiment of the invention, each device has a unique identifier, whether permanent or temporary. The user can create a user group, a small set of friends, or a larger group, for example, all Georgia Institute of Technology football fans. Each device utilizes a low-power radio transmitter for transmitting data over a short range, say twenty meters. When one device comes within signal range of another device, the devices recognize each other. The devices then play a set of sounds programmed by the user, in the temporal sequence programmed by the user.

For example, when the Georgia Tech Yellow Jackets play football in Athens, Ga. against their archrivals, the University of Georgia Bulldogs, the crowds can get very dense entering and leaving the stadium. In this hostile environment, one must pay close attention to where they are walking to avoid being trampled. This makes it difficult to peruse the crowd for fellow fans. At the same time, Tech fans have a familiar call and response for these situations where one fan will call, "What's good word?" and a second fan will respond, "To Hell with Georgia!"With this invention, the phones can be programmed to accomplish this task whenever similarly affiliated fans come into close proximity. This invention allows friends to program their cellular telephones to play the "What's the good word?" and "To Hell with Georgia!" five seconds after they all come within fifty meters (for example) of each other, each telephone only the call or response.

Referring now to FIG. 1, a similar scenario is represented. Several Tech fans 100, 102,106 and several Georgia fans 108,109,110,112,113 are seen commingling outside the stadium 119 on game day. The Tech fans 100,102,106 each have cellular telephones 101,103,106 programmed with like identifying codes, while the Georgia fans 108,109,110,112, 113 have conventional phones 114,115,116,117,118. When the Tech fans 100,102,106 come into close proximity with each other, the first Tech fan's programmed phone 101 emits an RF signal 120 that is received by the other Tech fan's phones 103,111. When this occurs, the similarly programmed phones 103,111 receive the RF signal 120, verify the identification code, start a timer and rebroadcast an acknowledgement RF signal. When the first similarly programmed phone 101 receives the acknowledge signal, it verifies the identification and then emits a first message 104. The other phones 103,111, after a predetermined time lapses, as represented by a timer within, emit a second and third preprogrammed message 105,107.

Figure 2:
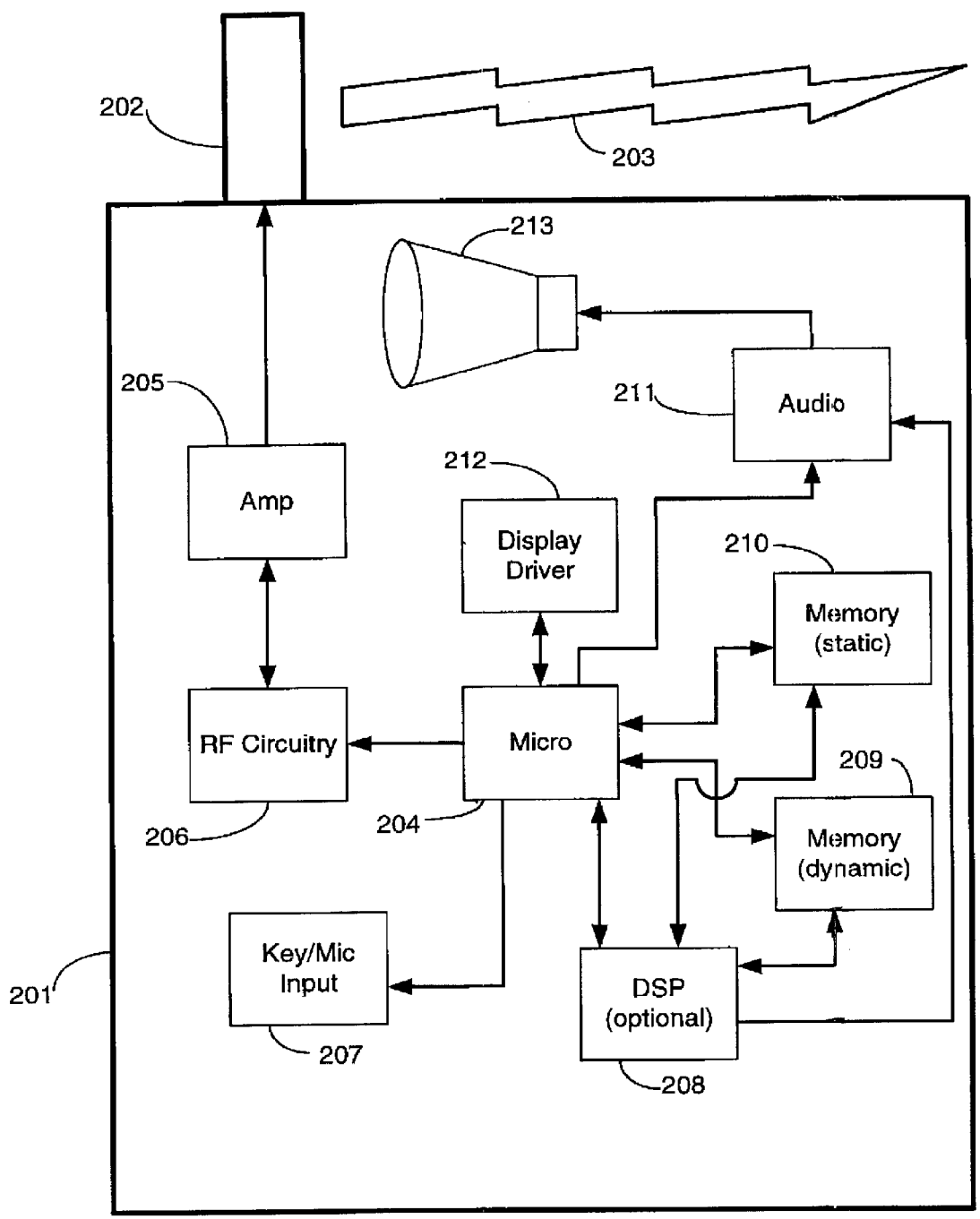
FIG. 2 is a block diagram of hardware in accordance with the invention.

Referring now to FIG. 2, exemplary hardware 200 to support the call and response function is illustrated therein. The phone 201 comprises traditional circuitry, including a central microprocessor 204 for running embedded programs, a display driver 212 for projecting information on a display or indicator, and both static 210 and dynamic 209 memory for storing parameters, user information, calls and responses, ID codes, and the like. The phone 201 also comprises an optional digital signal processor (DSP) for voice recognition and sound generation. There is a speaker 213 and microphone 207, along with corresponding audio processing and amplification circuitry 211, as well as RF circuitry 206 and RF amplification 205 for transmitting RF signals 203 from the antenna 202 to remote devices.

In one embodiment, the call and/or response may be downloaded into the memory 209,210 in a variety of ways: First, the user may download or create the message in a computer and transmit the message to the phone 201 through either a cable that synchronizes the phone 201 with the computer. Second, RF can be used, as the computer may call the phone 201 directly through a modem, thereby downloading the information digitally. Third, the user may speak a call or response into the microphone 207. This message can be converted into digital data through an analog to digital (A/D) converter incorporated into either the microprocessor 204 or DSP 208.

Figure 3:
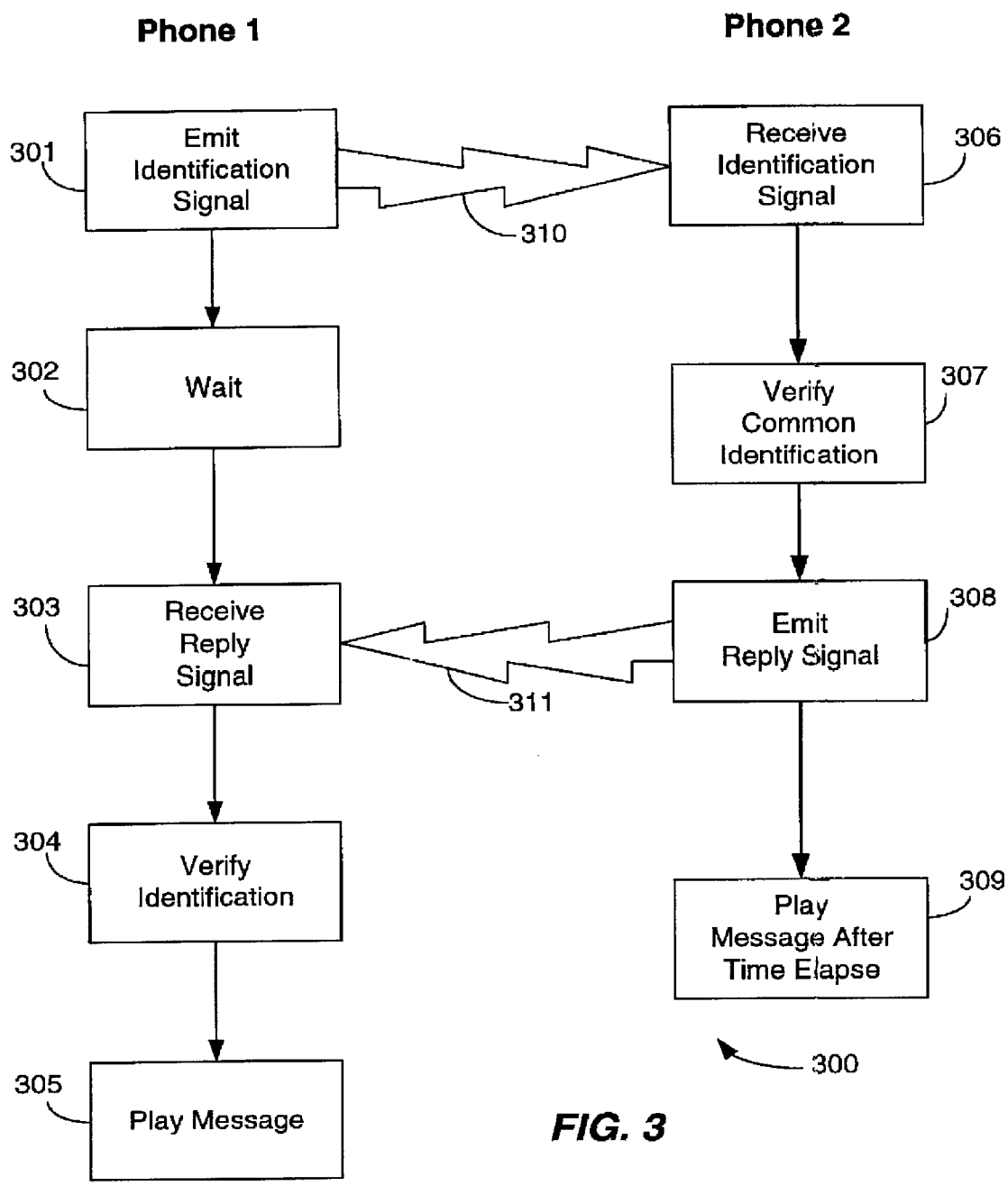
FIG. 3 is an exemplary flow chart of an audible exchange in accordance with the invention.

Referring now to FIG. 3, illustrated therein is an exemplary flow chart that the embedded software (firmware) running on a microprocessor might execute. In one embodiment, a phone emits an identifying signal 301 as an RF transmission 310. The ID signal may include information like team pf preference, family surname, or favorite musician, for example. The phone does this periodically at a predetermined or random frequency and subsequently waits for a response 302.

When a similarly programmed phone receives the RF transmission 310, it verifies that a common identifier has been received 307. If the identifying information is not common, the second phone ignores the RF transmission 310. If the ID is common or similar, the second phone emits an acknowledgement signal 308 as a second RF transmission 311. The second phone starts a timer for a predetermined wait.

The first phone receives this signal 304 and similarly goes through the ID verification process 304. Once like phones have been identified, the first phone emits a call 305. Once the second phone's timer has elapsed, the second phone emits a response 309.

In another example, each of the friend's telephones might play one part of a rock song: one telephone taking the bass guitar, another the alto, and a third the drums. As another example, each friend's telephone may emit a "hello", "hello", and "hello", each at the do-mi-so (from the do-re-mi-fa-so-la-ti-do scale) pitches correspondingly, to emulate the famous "Three Stooges" greeting.

In the simplest embodiment of the invention, each cellular telephone user could simply program the unique identifier of the members of his user group onto a simple, specialized web page, then select from a list of pre-programmed sounds. For example, certain rock music snippets might be listed. The user would enter the number of users, and the site would then divide the song into the corresponding number of parts. A user group three persons large would get three parts from which to choose, e.g. singer, bass guitar plus alto guitar, and drums. Each part would be placed on the screen with a particular user. Note that a person could belong to several musical user groups. A certain set of friends might have one musical group greeting, while other friends, or family members, might have another. The program and sounds would then either be downloaded through a serial or parallel port to the phone or, in the alternative, be downloaded wirelessly. The wireless download would be suitable for "wireless application protocol" (WAP) phones, for example.

In another embodiment of the invention, persons could use cellular telephones just as one uses stereo speakers today. When members of a user group came within proximity of each other, and one of them accessed the web site, they could download a song which would automatically break itself into parts or channels, with each part playing on one of the user's cellular telephones. Of course, such a system could be made better with the use of low power high fidelity speakers similar to those featured in a fall 1999 issue of Popular Science magazine. In one variant of this approach, the cellular telephone might have within it a low-power transmitter, which can transmit a commercial radio station frequency. That way, a nearby radio could be turned on and tuned to the correct station, and the user could take advantage of the much more powerful speaker of the nearby radio. The cellular telephone would indicate to the user what FM station to which he should turn. The cellular telephone of each group member might indicate a different FM station, to avoid interference problems. [The telephone might also be used as a bullhorn in this manner].

In another embodiment of the invention, members of a user group, and person outside it, could click on an icon on the website, and be presented with a musical score. Each person could choose a musical instrument, and a part, and the cellular telephone buttons would be made to correspond to the musical scale. The persons in this group could then play the music on the cellular telephone by pressing the buttons. This function would deactivate the normal touchtone frequencies on the keypad. For example, the buttons 1 through 8 could represent C, D, E, F, G, A, B, and C, the "#" key could make these tones sharp, while the "*" key could make them flat.

The telephone could include a data-port whereby a full or partial musical keyboard could be plugged into the telephone. Alternatively, the musical keyboard, or microphone, might communicate over a radio frequency with the cellular telephone. The Bluetooth protocol might be employed for the radio transmissions. However, that might not be strictly necessary, as a variety of toys, including Furby™ function without using this standard. Additionally, the standard cellular telephone radio frequency circuitry could equally be used for short range communications.

In one embodiment of the invention, each member of the user group could have a different type of device, with a different manufacturer for the device. For example, one member might have a Motorola cellular telephone, another member might have a Palm VII™ Personal Data Assistant, while a third member might have a Motorola two-way pager that includes a radio transmitter. The functions described above could be placed in the cellular telephone, or within a separate clip-on module that can exchange data with the telephone. This clip-on module might well be the cellular telephone battery.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the identifying signal has been preferably described as a RF signal, lasers, audio and other means could easily be implemented as well.

What is claimed is:

1. A communications system, comprising:
   a. a first communications device having a first programmable audible announcement and a first identifier; and
   b. at least one other communications device having a second programmable audible announcement and a second identifier;
      wherein when either the first communications device or the at least one other communications device come into close proximity, wherein the close proximity comprises a distance of less than fifty meters, the first communication device and the at least one other communications device transmit and receive the first and second identifiers respectively, and emit the first programmable audible announcement and the second programmable audible announcement respectively when the first and second identifiers have a common characteristic;

wherein the first communications device and the at least one other communications device are selected from the group consisting of telephones, cellular telephones, pagers, two-way radios, personal digital assistants, computers and rechargeable batteries;

wherein the programmable announcements are programmed by a means selected from the group consisting of computer download, internet download, voice input, keypad input, radio frequency download and wireless application protocol download;

wherein the first programmable audible announcement comprises a call and the second programmable audible announcement comprises a response.

2. An electronic communications device, comprising:

a. a communications means for transmitting and receiving electronic data;

b. programmable identification data;

c. a processing means for verifying identification data;

d. a programmable audio sound, wherein the programmable audio sound comprises music;

e. a communications means for generating audible sound;

f. an analog to digital converter for converting analog sound into binary information;

g. a digital to analog converter for converting digital data into analog sound;

h. a memory module for storing the programmable identification data and programmable sound in digital form; and i. an external input device for actuating the musical instrument sounds;

wherein the communications means for generating audible sound broadcasts a programmable sound when a second communications means comprising similar programmable identification data and a second programmable audio sound comes in close proximity, and the similar programmable identification data is received;

further comprising a downloadable musical score.

* * * * *